(12) United States Patent
Yang et al.

(10) Patent No.: US 12,519,734 B2
(45) Date of Patent: Jan. 6, 2026

(54) ELECTRONIC DEVICE AND COMMUNICATION CONTROL METHOD THEREOF

(71) Applicant: SAMSUNG ELECTRONICS CO., LTD., Suwon-si (KR)

(72) Inventors: Changmok Yang, Suwon-si (KR); Chounjong Nam, Suwon-si (KR); Taeyong Kim, Suwon-si (KR); Sungbin Min, Suwon-si (KR); Hyunkee Min, Suwon-si (KR); Sunkee Lee, Suwon-si (KR); Eonji Lee, Suwon-si (KR); Mincheol Jeong, Suwon-si (KR); Junyeop Jung, Suwon-si (KR); Junsu Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 26 days.

(21) Appl. No.: 18/757,022

(22) Filed: Jun. 27, 2024

(65) Prior Publication Data
US 2024/0348552 A1    Oct. 17, 2024

Related U.S. Application Data

(63) Continuation of application No. PCT/KR2022/021409, filed on Dec. 27, 2022.

(30) Foreign Application Priority Data

Dec. 31, 2021    (KR) .................. 10-2021-0193674

(51) Int. Cl.
*H04L 47/25* (2022.01)
(52) U.S. Cl.
CPC .................. *H04L 47/25* (2013.01)

(58) Field of Classification Search
None
See application file for complete search history.

(56) References Cited

U.S. PATENT DOCUMENTS

| | | | |
|---|---|---|---|
| 7,782,785 | B2 | 8/2010 | Lee et al. |
| 11,153,782 | B2 | 10/2021 | Hwang et al. |
| (Continued) | | | |

FOREIGN PATENT DOCUMENTS

| | | |
|---|---|---|
| CN | 105101438 A | 11/2015 |
| CN | 107277853 A | 10/2017 |
| (Continued) | | |

OTHER PUBLICATIONS

Utsumi et al., "Refining Calculation Algorithm for Packet Pacing Rate of BBR", May 13, 2021, IEEE, 2021 IEEE International Workshop Technical Committee on Communications Quality and Reliability (CQR 2021) (2021, pp. 1-6) (Year: 2021).*

(Continued)

*Primary Examiner* — Davoud A Zand
(74) *Attorney, Agent, or Firm* — Jefferson IP Law, LLP

(57) ABSTRACT

Electronic devices according to present disclosure may comprise: a communication circuit which supports a plurality of communication links including a first link and a second link through a plurality of frequency bands; and at least one processor, wherein the at least one processor is configured to: distribute data packets to be transmitted at least one of the plurality of communication links, respectively; identify a first transmission rate of the first link and a second transmission rate of the second link; and perform at least one of an adjustment of the transmission rates or an adjustment of the number of distribution of data packets for the first link and the second link so that a difference between (Continued)

transmission times of the data packets distributed to the first link and the second link, respectively, is within a designated time range.

20 Claims, 12 Drawing Sheets

(56) References Cited

U.S. PATENT DOCUMENTS

| | | |
|---|---|---|
| 2009/0274131 A1 | 11/2009 | Lee et al. |
| 2010/0110991 A1 | 5/2010 | Kwak |
| 2015/0156788 A1 | 6/2015 | Yu et al. |
| 2017/0207976 A1* | 7/2017 | Rovner ............... H04L 43/0894 |
| 2017/0295587 A1* | 10/2017 | Lam ....................... H04L 43/16 |
| 2019/0230554 A1 | 7/2019 | Kang et al. |
| 2019/0363963 A1* | 11/2019 | Nilsson ................... H04L 47/28 |
| 2020/0015317 A1 | 1/2020 | Tang |
| 2021/0105859 A1 | 4/2021 | Hsu et al. |
| 2021/0360650 A1 | 11/2021 | Huang |

FOREIGN PATENT DOCUMENTS

| | | |
|---|---|---|
| KR | 10-2009-0114806 A | 11/2009 |
| KR | 10-1499996 B1 | 3/2015 |
| KR | 10-2018-0118290 A | 10/2018 |
| KR | 10-2180980 B1 | 11/2020 |
| KR | 10-2337555 B1 | 12/2021 |

OTHER PUBLICATIONS

International Search Report & Written Opinion for PCT/KR2022/021409 by Korean Intellectual Property Office dated Mar. 24, 2023.

* cited by examiner

ELECTRONIC DEVICE AND COMMUNICATION CONTROL METHOD THEREOF

CROSS-REFERENCE TO RELATED APPLICATIONS

This application is a continuation application of International Application No. PCT/KR2022/021409 designating the United States, filed on Dec. 27, 2022, in the Korean Intellectual Property Office and claiming priority to Korean Patent Application No. 10-2021-0193674, filed on Dec. 31, 2021, in the Korean Intellectual Property Office, the disclosures of which are incorporated by reference herein in their entireties.

TECHNICAL FIELD

Various embodiments disclosed herein relate to electronic devices and a communication control method thereof, for example, a method for controlling communication through multiple links and an electronic device therefor.

BACKGROUND

With the proliferation of various electronic devices, improvements in speed for wireless communications that can be used by various electronic devices have been implemented. Among wireless communications supported by recent electronic devices, IEE 802.11 WLAN (or Wi-Fi) is a standard for implementing high-speed wireless connections on various electronic devices. The first implementations of Wi-Fi could support transmission rates of up to 1 to 9 Mbps, while Wi-Fi 6 or Wi-Fi 7 technology may support transmission rates of up to about 10 Gbps.

Electronic devices may support, through wireless communication supporting a fast transmission rate, a variety of services that utilize relatively large amounts of data (e.g., video streaming services of UHD quality, augmented reality (AR) services, virtual reality (VR) services, and/or mixed reality (MR) services), as well as a variety of other services.

The IEEE 802.11 WLAN standard will likely introduce technologies for supporting multi-link operation (MLO) to increase the speed of data transmission and reception and reduce the latency thereof. Electronic devices that support multi-link operation are expected to be able to transmit and receive data through multiple links, resulting in relatively high transmission speeds and low latency.

In addition, IEEE 802.11be will introduce multi-AP cooperation, in which an electronic device is connected to multiple access points to transmit or receive data through multiple links.

DISCLOSURE

In an electronic device, the use of a synchronous mode for synchronizing transmission times of data transmitted through multiple links in a multi-link communication, such as multi-link operation or multi-AP cooperation, may require matching transmission start and end times on all links.

An electronic device 101 according to various embodiments, for example, as shown in FIG. 1, may provide synchronization of transmission times of data transmitted through multiple links in a multi-link communication despite a difference in transmission rates due to different channel environments with regard to each link.

The electronic device 101 according to various embodiments may synchronize transmission times of data transmitted through multiple links in a multi-link communication by redistributing, with regard to each link, data packets distributed over the multiple links.

Example advantages of the present disclosure are not limited to those mentioned above, and other technical tasks not mentioned may be apparent to those skilled in the art from the following description.

An electronic device according to various embodiments disclosed herein may include a communication circuit which supports multiple communication links including a first link and a second link through multiple frequency bands, and at least one processor operatively connected to the communication circuit, wherein the at least one processor is configured to distribute data packets to be transmitted through the communication circuit to at least one of the multiple communication links, respectively, identify a first transmission rate of the first link and a second transmission rate of the second link, and perform at least one of an adjustment of the transmission rates or an adjustment of the number of distribution of data packets for the first link and the second link so that a difference between transmission times of the data packets distributed to the first link and the second link, respectively, is within a designated time range, based on the first transmission rate, the second transmission rate, and the total number of data packets transmitted through the multiple communication links.

A method utilizing an electronic device according to various embodiments may include distributing data packets to be transmitted through multiple communication links including a first link and a second link through multiple frequency bands to at least one of the multiple communication links, respectively, identifying a first transmission rate of the first link and a second transmission rate of the second link, and performing at least one of an adjustment of the transmission rates or an adjustment of the number of distribution of data packets for the first link and the second link so that a difference between transmission times of the data packets distributed to the first link and the second link, respectively, is within a designated time range, based on the first transmission rate, the second transmission rate, and the total number of data packets transmitted through the multiple communication links.

ADVANTAGEOUS EFFECTS

According to various embodiments disclosed herein, an electronic device may synchronize transmission times of data transmitted through multiple links in multi-link communication to match transmission end times of data packets.

The electronic device 101 according to various embodiments may synchronize transmission times of data transmitted through multiple links in a multi-link communication by redistributing, with regard to each link, data packets distributed over the multiple links despite a difference in transmission rates due to different channel environments for each link.

The electronic device 101 according to various embodiments may redistribute data packets with regard to each link based on a link-specific transmission rate and the number of distributed data packets in multi-link communication to increase transmission efficiency over the multiple links.

In addition, various other advantages that are identified directly or indirectly herein can be realized.

BRIEF DESCRIPTION OF DRAWINGS

In connection with the description of the drawings, the same or similar reference numerals may be used for the same or similar elements.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

Figure 1:
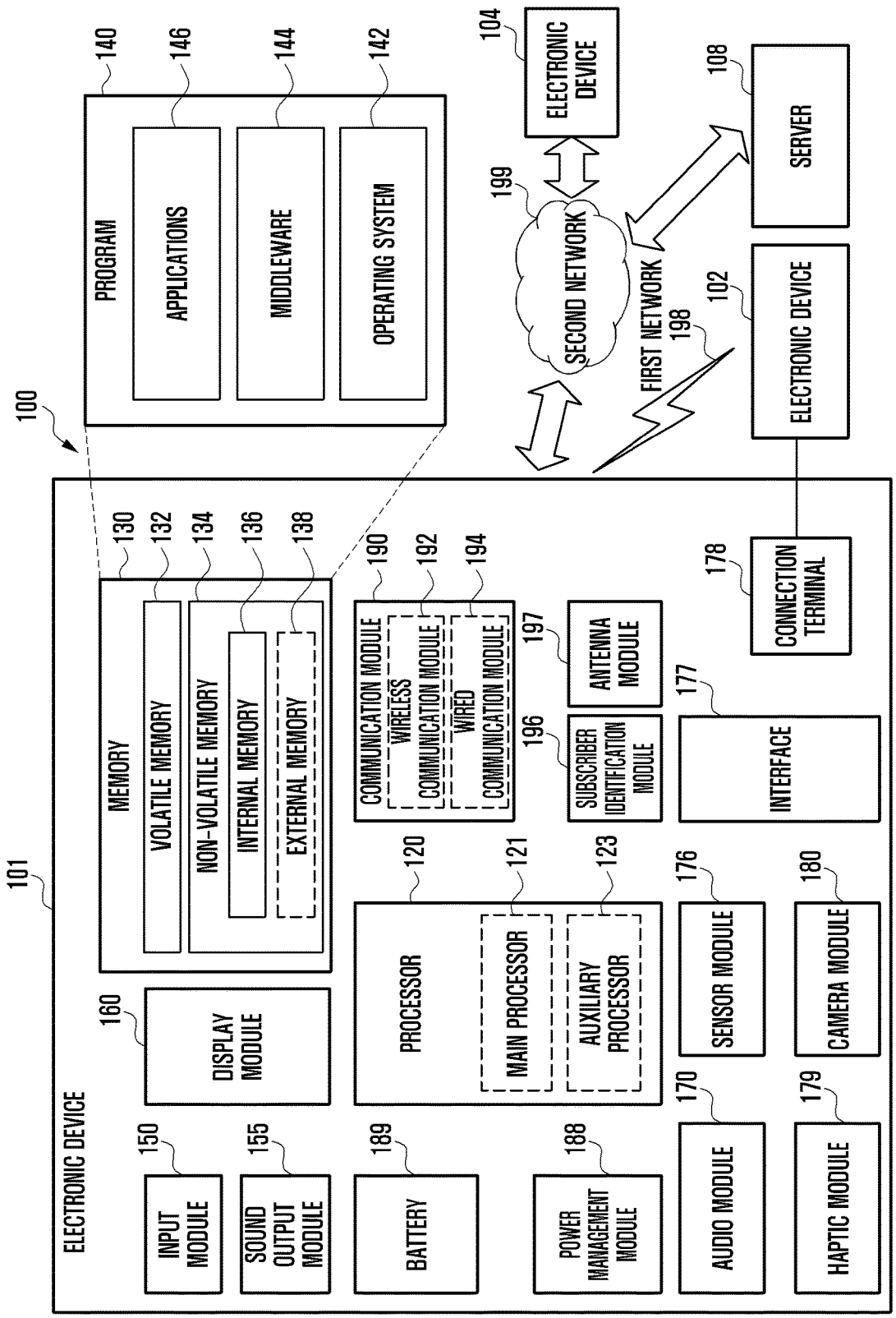
FIG. 1 is a block diagram of an electronic device in a network environment according to various embodiments.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
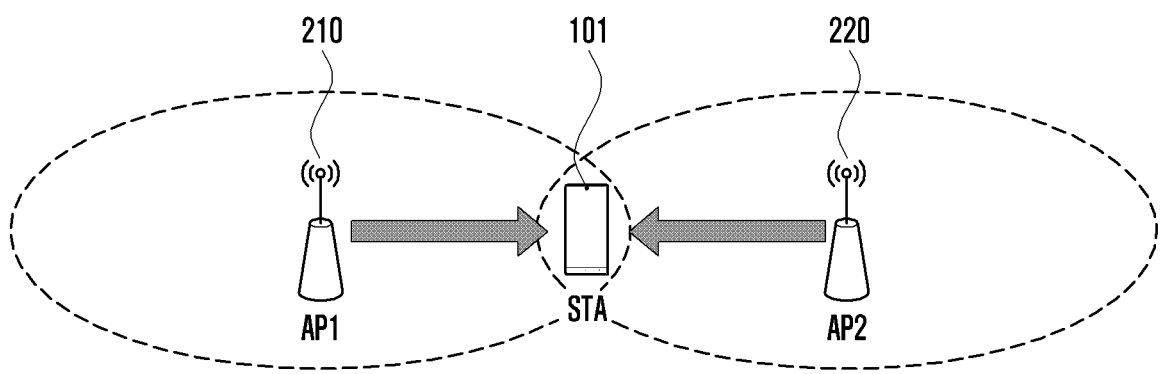
FIG. 2 illustrates an example in which an electronic device performs multi-link communication according to multi-AP cooperation by multiple access points (APs) according to various embodiments.

FIG. 2 illustrates an example in which an electronic device performs multi-link communication according to multi-AP cooperation by multiple access points (APs) according to various embodiments.

Referring to FIG. 2, a wireless LAN system may include an electronic device (e.g., the electronic device 101 of FIG. 1) and multiple access points 210 and 220 (e.g., the electronic device 102 of FIG. 1). According to an embodiment, the two access points 210 and 220 may each be connected to and communicate with one electronic device 101 through a radio link. For multi-link communication, the access points 210 and 220 may share interference information with each other, and may use separate orthogonal frequency division multiple access (OFDMA) resource units or cooperatively perform beamforming to avoid interference occurring between established radio links. In this case, information exchange between the access points 210 and 220 may be performed using a backhaul or through direct communication with each other.

Figure 3:
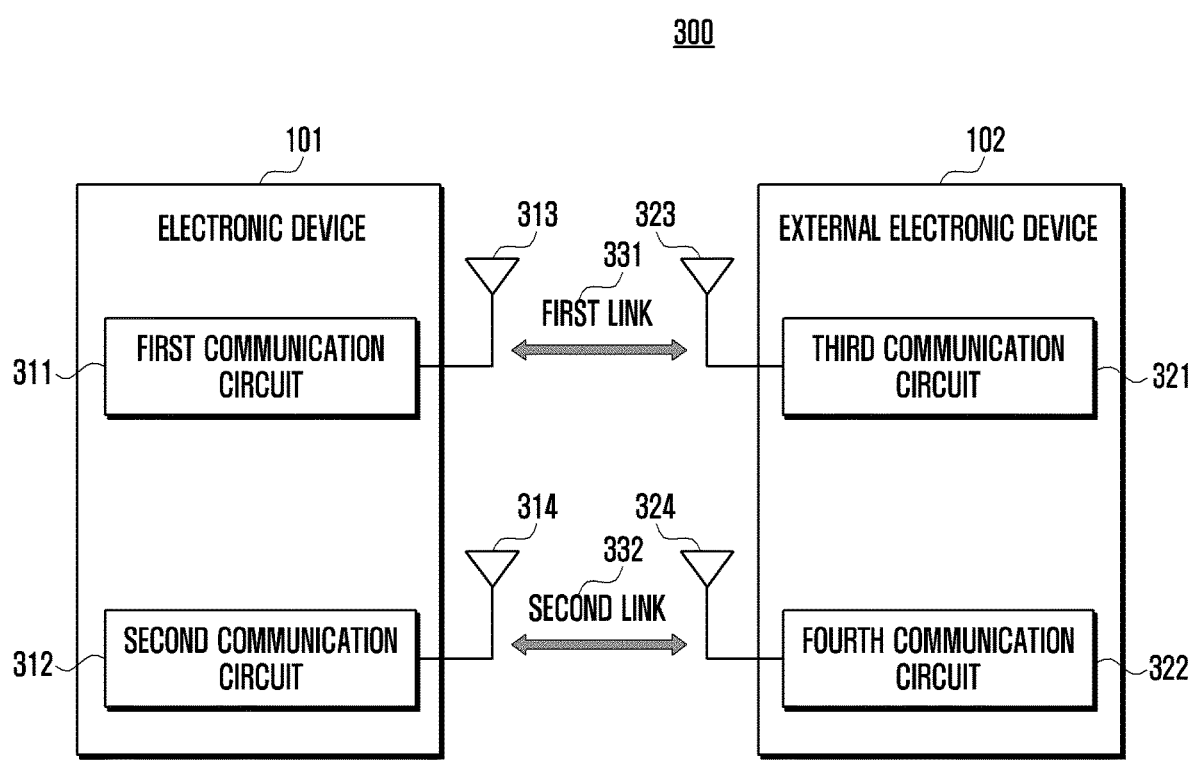
FIG. 3 illustrates an example in which an electronic device performs multi-link communication with one access point according to multi-link operation (MLO), according to various embodiments.

FIG. 3 illustrates an example in which an electronic device performs multi-link communication with one access point according to multi-link operation (MLO), according to various embodiments.

Referring to FIG. 3, a wireless LAN system 300 may include an electronic device (e.g., the electronic device 101 of FIG. 1) and/or an external electronic device (e.g., the electronic device 102 of FIG. 1). Operations of the electronic device 101 described below may be performed under the control of at least one processor (e.g., the processor 120 of FIG. 1). According to an embodiment, the electronic device 101 may perform wireless communication with the external electronic device 102 through short-range wireless communication. Wireless communication may refer to various communication methods that both the electronic device 101 and/or the external electronic device 102 may support. For example, the wireless communication may be Wi-Fi. The external electronic device 102 may serve as a base station for providing wireless communication to at least one electronic device 101 located within a communication radius of the wireless LAN system 300. For example, the external electronic device 102 may include an access point (AP) of IEEE 802.11. The electronic device 101 may include a station (STA) of the IEEE 802.11.

According to various embodiments of the disclosure, the electronic device 101 and/or the external electronic device 102 may support multi-link operation (MLO). The multi-link operation may be an operation mode in which data is transmitted or received through multiple links (e.g., a first link 331 and a second link 332). The multi-link operation may be an operation mode planned to be introduced in IEEE 802.11be, and may be an operation mode in which data is transmitted or received through multiple links based on multiple bands or channels.

According to various embodiments of the disclosure, the electronic device 101 may include multiple communication circuits (e.g., a first communication circuit 311 and/or a second communication circuit 312) to support multi-link operation. The first communication circuit 311 may transmit data to the external electronic device 102 through the first link 331 or receive data transmitted by the external electronic device 102 through the first link 331. The first communication circuit 311 may output or receive a signal of a frequency band corresponding to the first link 331 through a first antenna 313. The second communication circuit 312 may transmit data to the external electronic device 102 through the second link 332, or receive data transmitted by the external electronic device 102 through the second link 332. The second communication circuit 312 may output or receive a signal of a frequency band corresponding to the second link 332 through a second antenna 314.

According to various embodiments of the disclosure, the external electronic device 102 may include multiple communication circuits (e.g., a third communication circuit 321 and/or a fourth communication circuit 322) to support multi-link operation. The third communication circuit 321 may transmit data to the electronic device 101 through the first link 331 or receive data transmitted by the electronic device 101 through the first link 331. The third communication circuit 321 may output or receive a signal of a frequency band corresponding to the first link 331 through a third antenna 323. The fourth communication circuit 322 may transmit data to the electronic device 101 through the second link 332 or receive data transmitted by the electronic device 101 through the second link 332. The fourth communication circuit 322 may output or receive a signal of a frequency band corresponding to the second link 332 through a fourth antenna 324.

According to various embodiments of the disclosure, the frequency band of the first link 331 and the frequency band of the second link 333 may be different from each other. For example, the frequency band of the first link 331 may be 2.5 GHz, and the frequency band of the second link 332 may be 5 GHz or 6 GHz.

According to various embodiments of the disclosure, the first link 331 and the second link 332 may also use other electronic devices than the electronic device 101. In order to prevent a situation in which the electronic device 101 and the other electronic device simultaneously transmit or receive data through the same link, the electronic device 101 may support a carrier sense multiple access with collision avoidance (CSMA/CA) method. The CSMA/CA method may be a method of transmitting data when a specific link is in an idle state. The electronic device 101 for supporting the CSMA/CA may identify whether the other electronic device is transmitting data through a specific link and, upon detecting the transmission of data, may delay transmission instead of transmitting data through a specific link. Conversely, in response to identifying that the other electronic device is not transmitting data through a specific link, the electronic device 101 for supporting the CSMA/CA may transmit data through a specific link according to a designated method (e.g., activating a timer and transmitting data when the timer expires). Through this above method, the electronic device 101 may perform data transmission and/or reception using a specific link, preventing or mitigating conflict with other electronic devices.

According to various embodiments of the disclosure, the first link 331 and/or the second link 332 supported by multi-link operation may independently support the CSMA/CA.

In some embodiments, the electronic device 101 for supporting the CSMA/CA method may identify whether a specific link is in an idle state before performing data transmission. The electronic device 101 may transmit data through a specific link which is in an idle state.

In some embodiments, the electronic device 101 may identify whether the first link 331 is in an idle state based on information included in data transmitted by the external electronic device 102, for example, information which is related to the idle state of the first link 331. The information related to the idle state of the first link 331 may include a clear channel assessment (CCA) state field and/or a network allocation vector (NAV) configuration field. The information related to the idle state of the first link 331 may be included in a ready to send (RTS) message requesting data transmission through the first link 331 and a clear to send (CTS) message indicating that data transmission through the first link 331 is possible. The electronic device 101 may identify whether a specific link is in an idle state by referring to the clear channel assessment (CCA) state field and/or the network allocation vector (NAV) configuration field. The electronic device 101 may determine whether the first link 331 is in a physically idle state by referring to the CCA state field, and may determine whether the first link 331 is in a logically idle state by referring to the NAV configuration field. The electronic device 101 may activate a timer in response to identifying that the first link 331 is in an idle state, and may transmit data to the external electronic device 102 through the first link 331 in response to the timer expiring after a designated time.

The electronic device 101 may identify whether the second link 332 is in an idle state based on information included in data transmitted by the external electronic device 102, for example, information which is related to the idle state of the second link 332. The information related to the idle state of the second link 332 may include a clear channel assessment (CCA) state field and/or a network allocation vector (NAV) configuration field. The information related to the idle state of the second link 332 may be included in a ready to send (RTS) message requesting data transmission through the second link 332 and a clear to send (CTS) message indicating that data transmission through the second link 332 is possible. The electronic device 101 may identify whether a specific link is in an idle state by referring to the clear channel assessment (CCA) state field and/or the network allocation vector (NAV) configuration field. The electronic device 101 may determine whether the second link 332 is in a physically idle state by referring to the CCA state field, and may determine whether the second link 332 is in a logically idle state by referring to the NAV configuration field. The electronic device 101 may activate a timer in response to identifying that a specific link is in an idle state, and may transmit data to the external electronic device 102 through the second link 332 in response to the timer expiring after a designated time.

Hereinafter, various disclosed embodiments may illustrate examples of communication control methods in multi-link communication according to multi-AP cooperation illustrated in FIG. 2, and/or multi-link communication according to multi-link operation (MLO) illustrated in FIG. 3.

According to various embodiments, an electronic device (e.g., the electronic device 101 of FIG. 1 or FIG. 3) may include a communication circuit (e.g., the communication module 190 of FIG. 1, the first communication circuit 311, and/or the second communication circuit 312 of FIG. 3) which supports multiple communication links including a first link and a second link through multiple frequency bands, and at least one processor (e.g., the processor 120 of FIG. 1) operatively connected to the communication circuit, wherein the at least one processor is configured to distribute data packets to be transmitted through the communication circuit to at least one of the multiple communication links, respectively, identify a first transmission rate of the first link and a second transmission rate of the second link, and perform at least one of an adjustment of the transmission rates or an adjustment of the number of distribution of data packets for the first link and the second link so that a difference between transmission times of the data packets distributed to the first link and the second link, respectively, is within a designated time range, based on the first transmission rate, the second transmission rate, and the total number of data packets transmitted through the multiple communication links.

According to various embodiments, the at least one processor may, in a case that the number of data packets distributed to the first link and the second link is designated respectively, redistribute at least one of the packets distributed to the second link having a longer transmission time to the first link having a shorter transmission time.

According to various embodiments, the at least one processor may be configured to calculate the number of data packets to be redistributed from the second link to the first link based on an inverse ratio between the first transmission rate and the second transmission rate, for example, by using the first transmission rate of the first link and the number of data packets distributed to the first link, and the second transmission rate of the second link and the number of data packets distributed to the second link.

According to various embodiments, the at least one processor may identify the total number of data packets transmitted through the multiple communication links, the first transmission rate of the first link, and the second transmission rate of the second link, and calculate the number of data packets to be distributed to the first link and the second link, respectively.

According to various embodiments, the at least one processor may identify the first transmission rate of the first link, the second transmission rate of the second link, and the number of packets distributed to the multiple communication links, and calculate the number of the packets to be distributed to the first link and the second link, respectively, based on a ratio between the first transmission rate and the second transmission rate.

According to various embodiments, the at least one processor may, in a case that the number of data packets distributed to the first link and the second link is designated respectively, calculate a transmission time on the first link according to the first transmission rate and a transmission time on the second link according to the second transmission rate, respectively, and adjust at least one of the first transmission rate or the second transmission rate based on a difference between the transmission times.

According to various embodiments, the at least one processor may adjust the first transmission rate or the second transmission rate by lowering the first transmission rate by one level or increasing the second transmission rate by one level, and among the transmission rates of the first link and the second link, the first transmission is relatively fast and the second transmission rate is relatively slow.

According to various embodiments, the at least one processor may be configured to, in a case of increasing the second transmission rate of the second link by one level, estimate a signal to noise ratio (SNR) according to a previous transmission rate, calculate a bit error ratio (BER) of the second link based on the estimated SNR, and increase, when the calculated BER is less than a designated value, the second transmission rate of the second link by one level.

According to various embodiments, the at least one processor may be configured to calculate a data packet transmission time of the first link and the second link, respectively, in a case of lowering the first transmission rate of the first link by one level, and to lower the transmission rate of the first link by one level in a case that the transmission time of the first link is faster than the transmission time of the second link.

According to various embodiments, in an electronic device, the multiple communication links may include multiple communication links among a communication link of a 2.4 GHz frequency band, a communication link of a 5 GHz frequency band, or a communication link of a 6 GHz frequency band, which are based on Wi-Fi communication.

Figure 4:
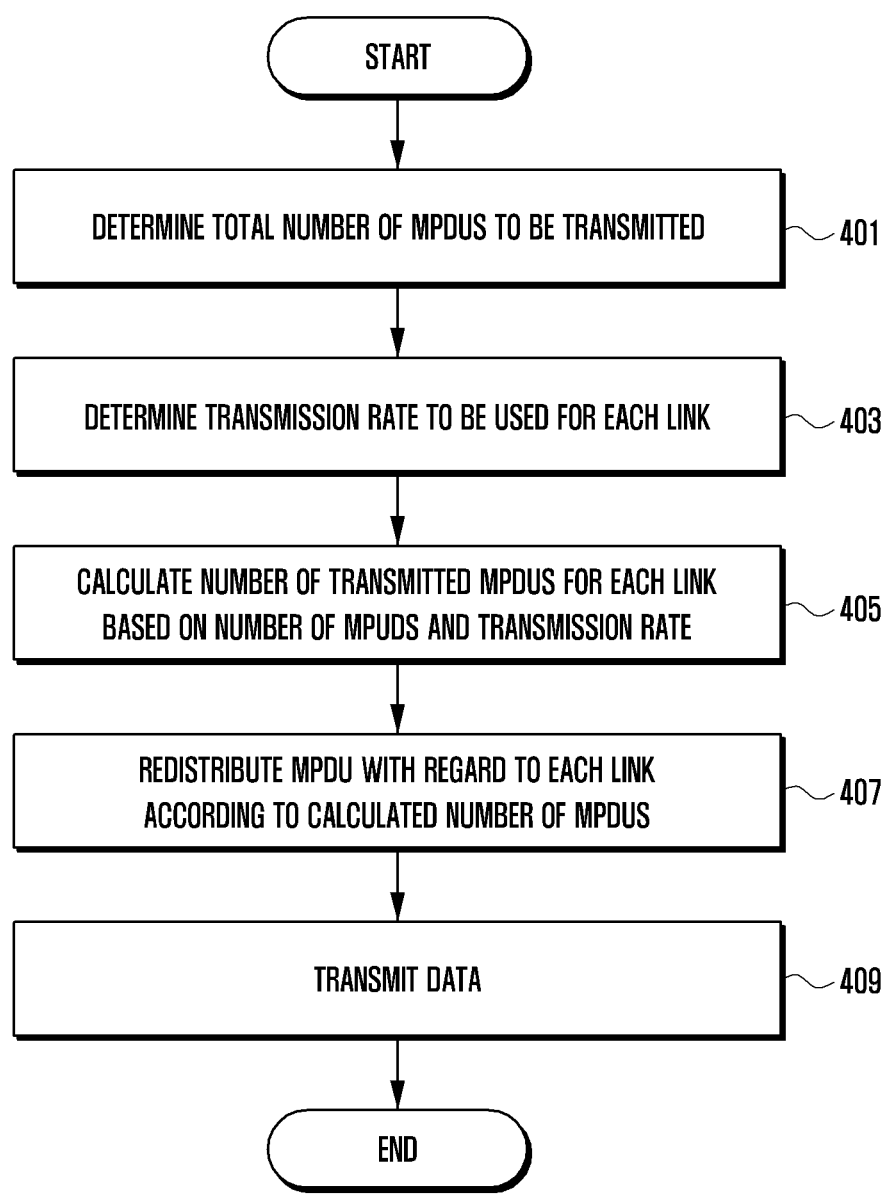
FIG. 4 is a flowchart illustrating an example of a method for controlling multi-link communication of an electronic device according to various embodiments.

FIG. 4 is a flowchart illustrating an example of a method for controlling multi-link communication of an electronic device (e.g., the electronic device 101 of FIG. 1) according to various embodiments.

Referring to FIG. 4, in multi-link communication, the electronic device 101 may allocate data packets (e.g., message protocol data units (MPDUs) to be transmitted through multiple links, by considering a transmission rate of each link, and may perform data transmission. For example, the multiple links may include a first link 331 and a second link 332 shown in FIG. 3.

According to an embodiment, in operation 401, the electronic device 101 may determine the number of data packets to be transmitted through multiple links. For example, in a case that specific data is to be transmitted, the corresponding data may be configured by N packets.

According to an embodiment, the electronic device 101 may determine a transmission rate to be used for each link in operation 403. For example, a transmission rate of a communication link may be configured based on a modulation and coding scheme (MCS). The MCS may be configured, for example, with 12 levels (indices 0 to 11), for example, with a data transmission rate of 0.4 to 0.9 Mb/s based on BPSK at level 0, a data transmission rate of 0.9 to 1.8 Mb/s based on quadrature Phase Shift Keying (QPSK) at level 1, a data transmission rate of 2.3 to 2.6 Mb/s based on QPSK at level 2, a data transmission rate of 1.5 to 3.5 Mb/s based on 16-QAM at level 3, a data transmission rate of 2.3 to 5.3 Mb/s based on 16-QAM at level 4, a data transmission rate of 6.0 to 7.1 Mb/s based on 64-QAM at level 5, a data transmission rate of 6.8 to 7.9 Mb/s based on 64-QAM at level 6, a data transmission rate of 7.5 to 8.8 Mb/s based on 64-QAM at level 7, a data transmission rate of 9.0 to 10.6 Mb/s based on 256-QAM at level 8, a data transmission rate of 10.0 to 11.8 Mb/s based on 256-QAM at level 9, a data transmission rate of 11.3 to 13.2 Mb/s based on 1024-QAM at level 10, and a data transmission of 12.5 to 14.76 Mb/s based on 1024-QAM at level 11. Here, each MCS level is described as an example, various variables may be applied to change a modulation scheme applied to the MCS level or to change a transmission rate corresponding thereto, and each MCS level may be preconfigured to increase a transmission rate in response to a modulation scheme being configured as the level increases.

According to an embodiment, multiple communication links may include both a fast link with a relatively fast transmission rate and a slow link with a relatively slow transmission rate. For example, the first link may be a communication link with a fast transmission rate (e.g., 5 or 6 GHz) and the second link may be a communication link with a slow transmission rate (e.g., 2.4 GHz). For example, in operation 403, the electronic device 101, for example, the electronic device 101 of FIGS. 1-3 discussed above, may determine a transmission rate to be used for each link. For example, the first link may be a communication link with a fast transmission rate (e.g., 5 or 6 GHz) and the second link may be a communication link with a slower transmission rate (e.g., 2.4 GHz). The electronic device 101 may re-determine a transmission rate for each link by adjusting an existing transmission rate thereof, and this will be described in detail later. For example, the electronic device 101 may determine a transmission rate of the first link to be $r_1$ and a transmission rate of the second link to be $r_2$.

According to an embodiment, in operation 405, the electronic device 101 may calculate the number of data packets to be transmitted with regard to each link, based on the total number of data packets to be transmitted and a transmission rate determined with regard to each link. For example, in a case that the number of data packets is N, the transmission rate of the first link is $r_1$ and the transmission rate of the second link is $r_2$, the number of data packets, $n_1$, to be transmitted in the first link and the number of data packets, $n_2$, to be transmitted in the second link in order to match the transmission times of the two links may be calculated using Equation 1 below.

$$n_1 = \frac{r_1}{r_1 + r_2} N, \quad n_2 = \frac{r_2}{r_1 + r_2} N \quad \text{Equation 1}$$

According to an embodiment, the electronic device 101 may, distribute data packets with regard to each link in operation 407, and may transmit data with regard to each link in operation 409, for example, according to the determined number of data packets to be transmitted with regard to each link.

Figure 5:
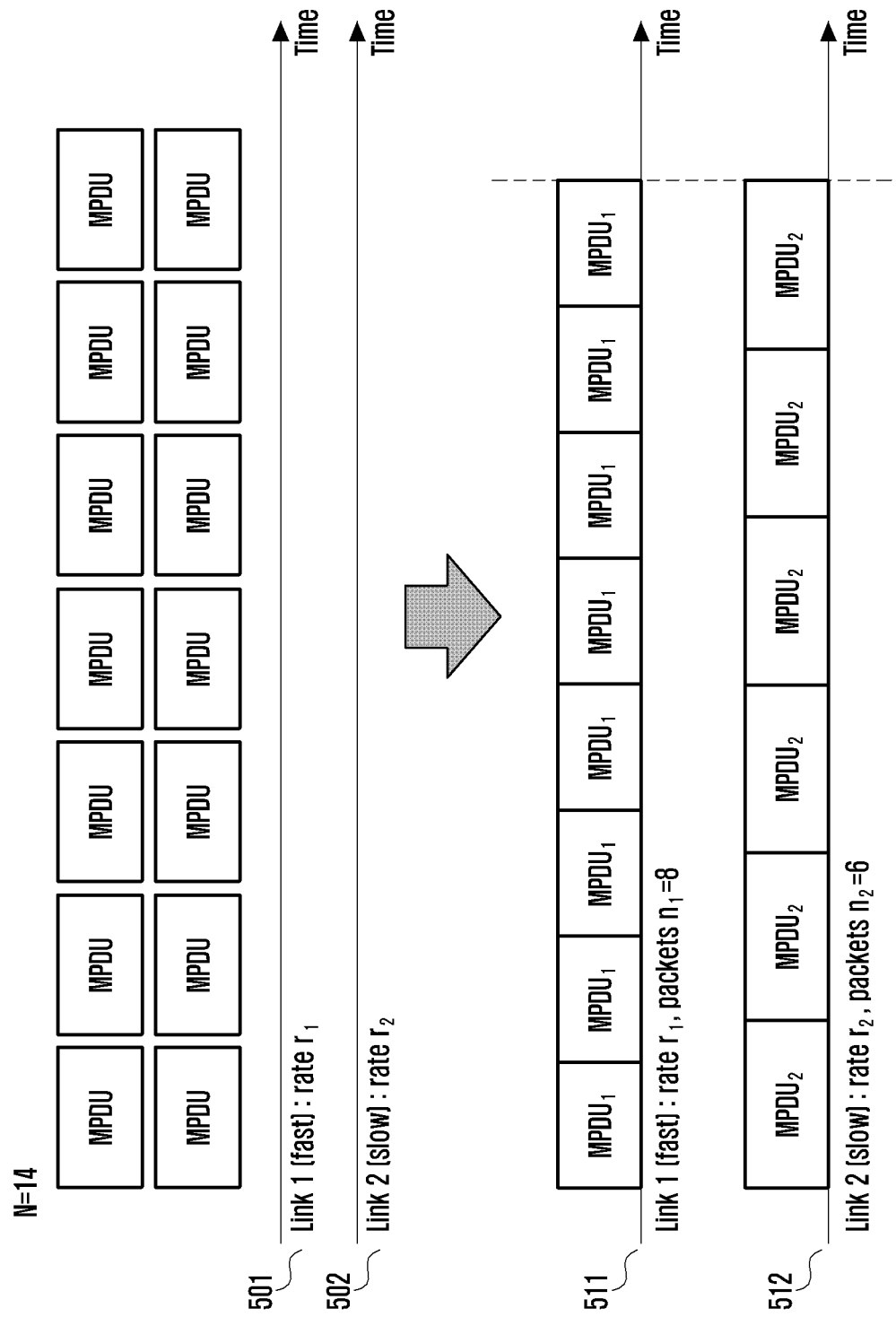
FIG. 5 illustrates an example of an operation of adjusting the number of transmission packets with regard to each link to control multi-link communication of an electronic device according to various embodiments.

FIG. 5 illustrates an example of an operation of adjusting the number of transmission packets with regard to each link to control multi-link communication of an electronic device according to various embodiments.

Referring to FIG. 5, when a total of 14 (N=14) data packets are to be transmitted, a transmission rate of a first link 501 may be determined to be $r_1$ and a transmission rate of a second link 502 may be determined to be $r_2$ less than $r_1$. Accordingly, when Equation 1 is applied, the number of packets to be transmitted, $n_1$, at the transmission rate $r_1$ on a first link 511 may be determined to be 8 ($n_1$=8), and the number of packets to be transmitted, $n_2$, at the transmission rate $r_2$ on a second link 512 may be determined to be 6 ($n_2$=6). Therefore, data transmission times in the first link 511 and the second link 512 may be synchronized, so that data transmission may be ended at the same time.

Figure 6:
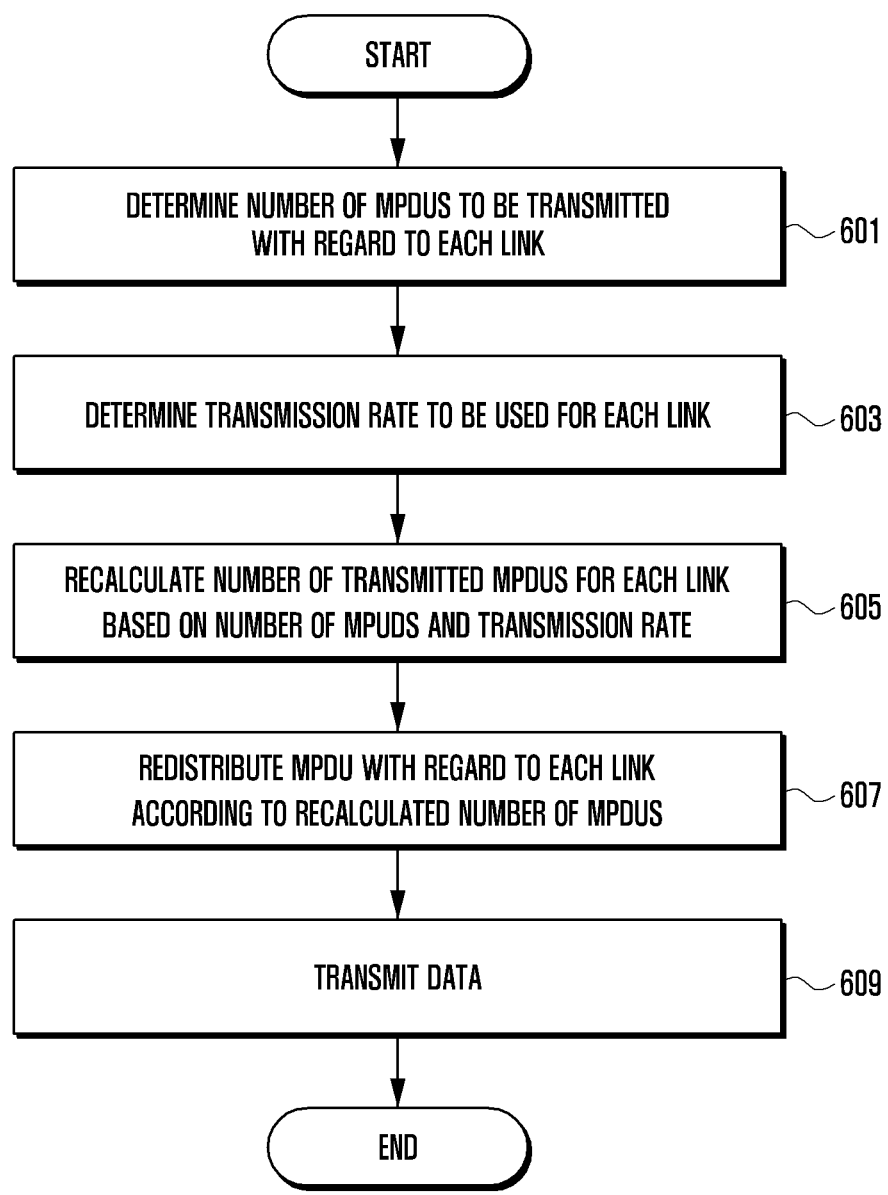
FIG. 6 is a flowchart illustrating another example of a method for controlling multi-link communication of an electronic device according to various embodiments.

FIG. 6 is a flowchart illustrating another example of a method for controlling multi-link communication of an electronic device according to various embodiments.

Referring to FIG. 6, in multi-link communication, the electronic device 101, for example, the electronic device 101 of FIGS. 1-3 discussed above, may, since a transmission rate is determined after determining the number of data packets (e.g., message protocol data units (MPDUs)) to be transmitted over each of multiple links, recalculate the number of data packets to be transmitted with regard to each link and then redistribute data packets to be transmitted with regard to each link.

According to an embodiment, the electronic device 101 may determine the number of data packets to be transmitted over each of multiple links in operation 601. For example, when specific data is to be transmitted, the number of data packets to be transmitted over each link may be predetermined.

According to an embodiment, the electronic device 101 may determine a transmission rate to be used for each link in operation 603. For example, a first link may be a communication link with a fast transmission rate (e.g., 5 or 6 GHz) and a second link may be a communication link with a slow transmission rate (e.g., 2.4 GHz). The electronic device 101 may determine a transmission rate for each link by adjusting an existing transmission rate thereof, and this will be described in detail later. For example, the electronic device 101 may determine a transmission rate of the first link to be $r_1$ and a transmission rate of the second link to be $r_2$.

According to an embodiment, in operation 605, the electronic device 101 may adjust and recalculate the number of data packets to be transmitted with regard to each link, based on the number of data packets to be transmitted with regard to each link and the transmission rate determined with regard to each link. For example, in a case that the first link has a transmission rate of $r_1$ and the number of packets to be transmitted is $n_1$, and the second link has a transmission rate of $r_2$ and the number of packets to be transmitted is $n_2$, when redistributing n packets from the second link, which is a slower link with a longer transmission time, to the first link, which is a faster link with a shorter transmission time in order to match the transmission times of the two links, the number of packets to be redistributed, n, may be calculated using Equation 2 below.

$$n = \left\lceil \frac{|r_1 n_2 - r_2 n_1|}{r_1 + r_2} \right\rceil \quad \text{Equation 2}$$

According to an embodiment, in operation 607, the electronic device 101 may redistribute data packets with regard to each link according to the recalculated number of data packets to be transmitted with regard to each link, and may transmit data with regard to each link in operation 609. For example, the electronic device 101 may redistribute, by additionally distributing n packets that were distributed to the second link, ($n_1$+n) data packets to the first link, and may redistribute, by excluding n packets, ($n_2$−n) data packets to the second link.

Figure 7:
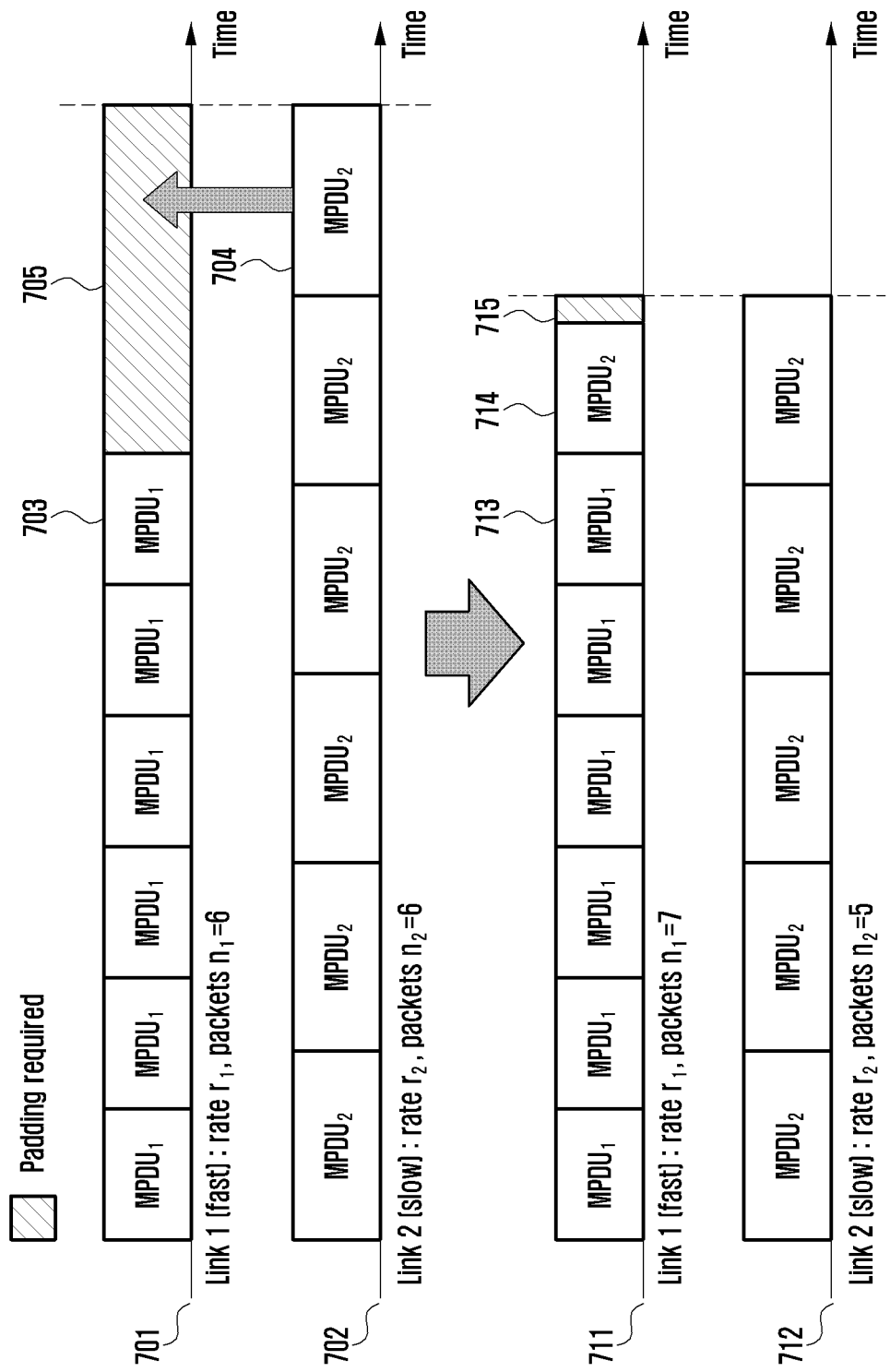
FIGS. 7 and 8 illustrate examples of an operation of adjusting the number of transmission packets with regard to each link to control multi-link communication of an electronic device according to various embodiments.

FIG. 7 illustrates example embodiments of an operation of adjusting the number of transmission packets with regard to each link to control multi-link communication of an electronic device according to various embodiments.

Referring to FIG. 7, a transmission rate of a first link 701 is identified as $r_1$ and the number of packets to be transmitted may be 6, and a transmission rate of a second link 702 is identified as $r_2$ and the number of packets to be transmitted may be 6. In this case, $r_1 > r_2$ may be satisfied, and in a fast first link, after transmission of a last packet 703 is completed, dummy data or duplicate data may be padded (indicated by reference numeral 705) and transmitted to match the transmission end time with that of a slow second link.

According to an embodiment, a value of n (n=1) may be calculated by applying Equation 2 to the number of packets $n_1$ ($n_1$=6) to be transmitted at a transmission rate $r_1$ on the first link and the number of packets $n_2$ ($n_2$=6) to be transmitted at a transmission rate $r_2$ on the second link. Therefore, as a result of redistribution, the number of transmission packets of a first link 711, $n_1'$, may be 7, and the number of transmission packets of a second link 712, $n_2'$, may be 5. Therefore, for example, the last packet 704 having been distributed to the second link 702 may be redistributed such that the last packet 704 is to be transmitted as a last packet 714 after the last packet 713 of the first link 711, the data transmission time over all links can be reduced and a padding area 715 of the fast link can be reduced, which results in reducing wasted resources for communication.

Figure 8:
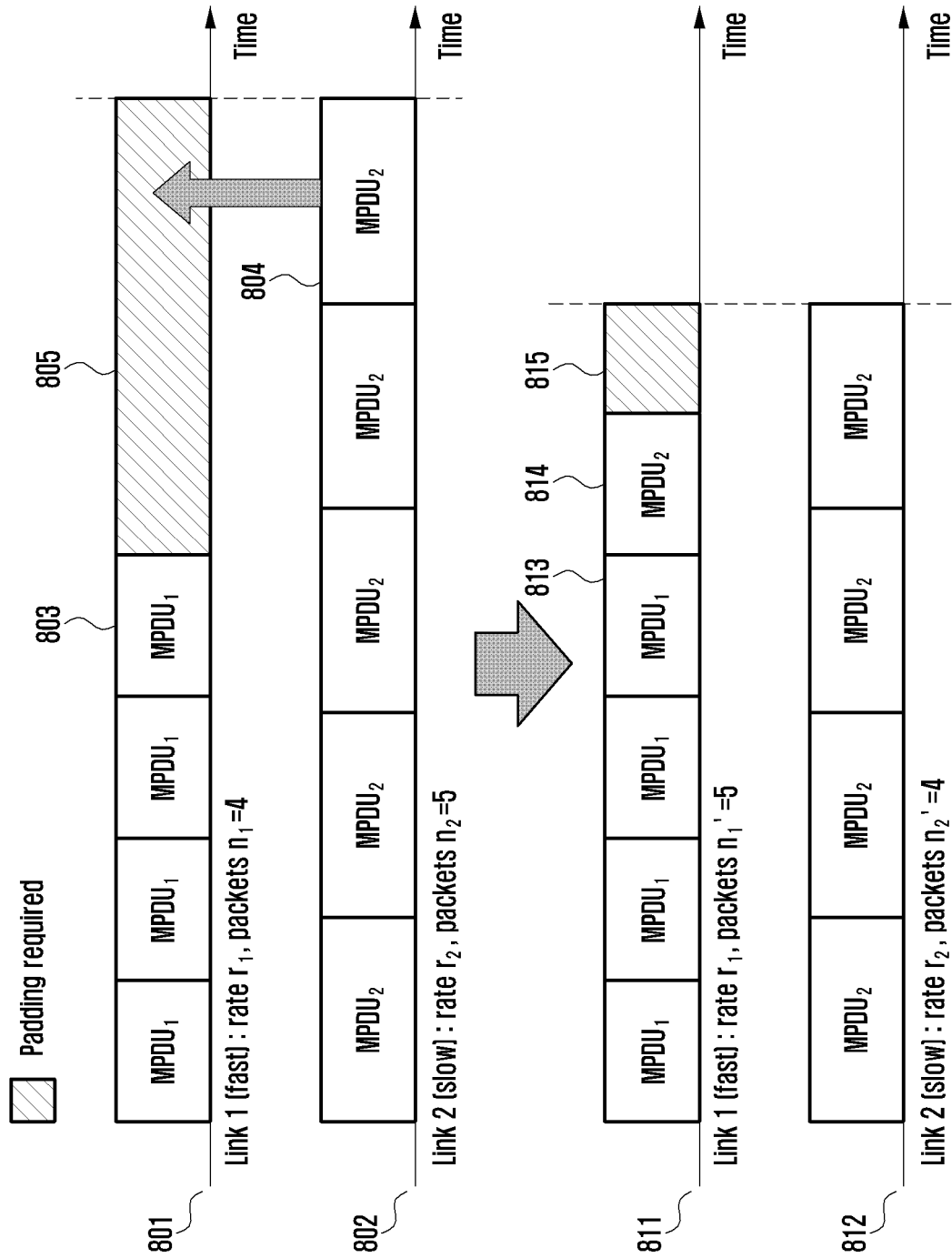

FIG. 8 illustrates example embodiments of an operation of adjusting the number of transmission packets with regard to each link to control multi-link communication of an electronic device according to various embodiments.

Referring to FIG. 8, a transmission rate of a first link 801 is identified as $r_1$ and the number of packets to be transmitted may be 4, and a transmission rate of a second link 802 is identified as $r_2$ which is slower than $r_1$ and the number of packets to be transmitted may be 5. In this case, in a fast first link, dummy data or duplicate data may be padded (indicated by reference numeral 805) and transmitted after the transmission of a last packet 803 is completed, to match the transmission end time with that of the second slow link.

According to an embodiment, a value of n (n=1) may be calculated by applying Equation 2 to the number of packets $n_1$ (n=4) to be transmitted at a transmission rate $r_1$ on the first link and the number of packets $n_2$ ($n_2$=5) to be transmitted at a transmission rate $r_2$ on the second link. Therefore, as a result of redistribution, the number of transmission packets of a first link 811, $n_1'$, may be 5, and the number of transmission packets of a second link 812, $n_2'$, may be 4. Therefore, for example, the last packet 804 having been distributed to the second link 802 may be redistributed such that the last packet 804 is to be transmitted as a last packet 814 after the last packet 813 of the first link 811, the data transmission time over all links can be reduced and a padding area 815 of the fast link can be reduced, which results in reducing wasted resources for communication.

Figure 9:
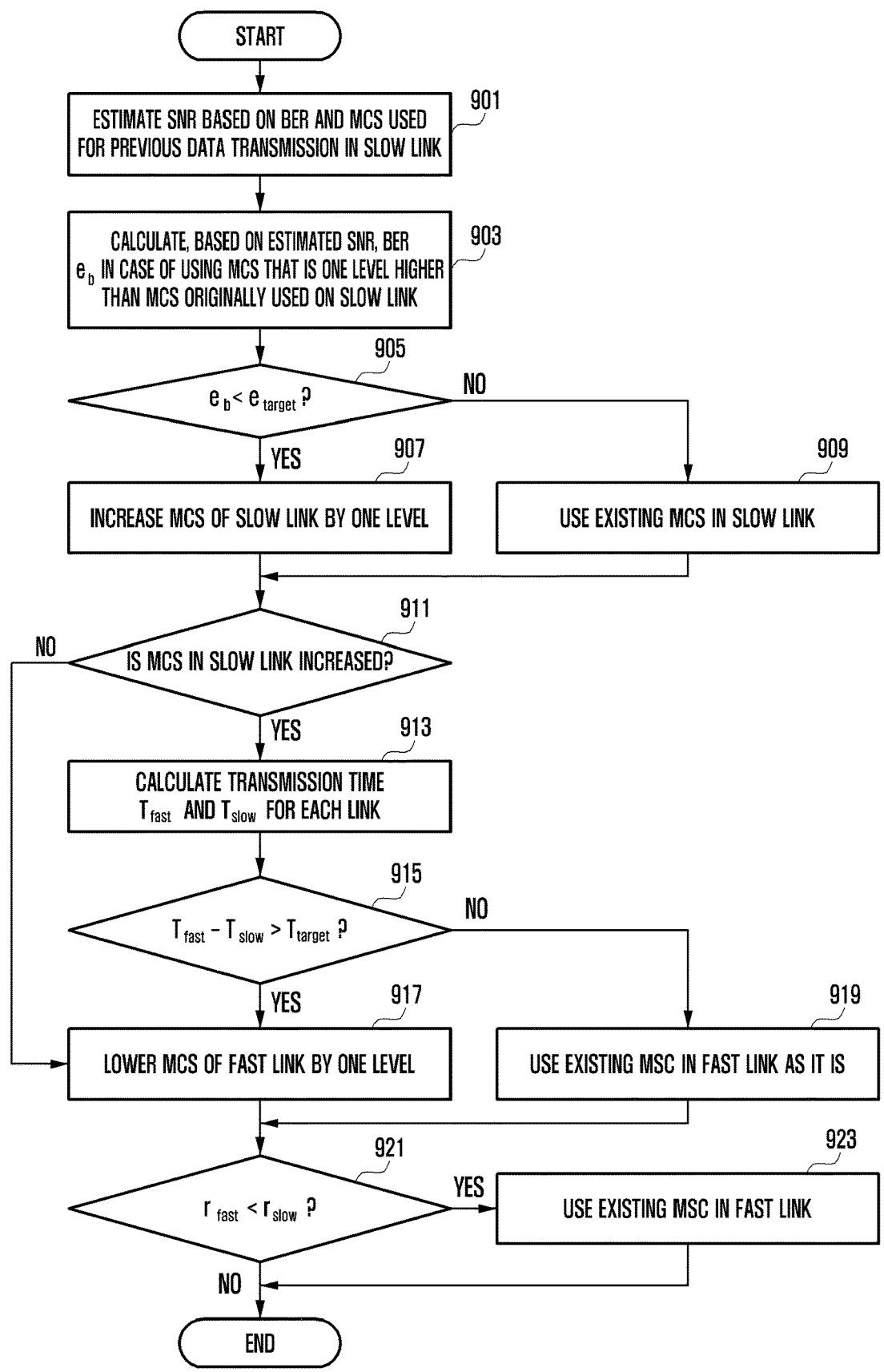
FIG. 9 is a flowchart illustrating another example of a method for controlling multi-link communication of an electronic device according to various embodiments.

FIG. 9 is a flowchart illustrating another example of a method for controlling multi-link communication of an electronic device (e.g., the electronic device 101 of FIG. 1) according to various embodiments.

Referring to FIG. 9, in multi-link communication, the electronic device 101 may adjust a data transmission rate for each of multiple links. According to an embodiment, the electronic device 101 may identify designated transmission rates of multiple communication links and, in order to match transmission end times by synchronizing transmission times of data transmitted over multiple links with each other, may re-adjust transmission rates of communication links in a manner of adjusting transmission rates by increasing or lowering transmission rates of at least one of the multiple links. Hereinafter described is a method of adjusting a transmission rate to match data transmission times for two communication links using a slow link and a fast link as examples, but various embodiments are not limited thereto and may be applied to two or more communication links.

According to an embodiment, the electronic device 101 may identify a transmission rate to be used for each link of multiple communication links. For example, a first link may be a communication link with a fast transmission rate (e.g., 5 or 6 GHz) and a second link may be a communication link with a slow transmission rate (e.g., 2.4 GHz). The electronic device 101 may determine a transmission rate for each link by adjusting an existing transmission rate thereof.

According to an embodiment, a transmission rate of at least one of multiple communication links may be adjusted to reduce a time to perform padding on the fast link by reducing a difference between transmission times of the multiple communication links.

According to an embodiment, in order to match data transmission times of a slow link and a fast link, the transmission rate of the slow link may be increased or the transmission rate of the fast link may be lowered, or the transmission rate of the slow link may be lowered and the transmission rate of the fast link may be increased.

Referring to FIG. 9, in operation 901, the electronic device 101 may estimate a signal-to-noise ratio (SNR) of previous transmission, based on a bit error ratio (BER) of previous data transmission and a transmission rate used for the previous data transmission in the slow link.

According to an embodiment, the BER may be estimated from a packet error ratio (PER), and from the PER of N packets, the BER may be calculated using Equation 3 below.

$$BER = 1 - (1 - PER)^{\frac{1}{N}} \qquad \text{Equation 3}$$

According to an embodiment, the electronic device 101 may estimate the SNR by using the following Equation 4, based on the BER calculated based on Equation 3 and MCS information used in the previous data transmission.

$$BER_{(\gamma_b)} = \begin{cases} Q(\sqrt{2\gamma_b}) & (BPSK, QPSK) \\ \dfrac{4(\sqrt{M}-1)}{\sqrt{M}\log_2 M} Q\left(\sqrt{\dfrac{3\gamma_b \log_2 M}{M-1}}\right) & M-QAM \end{cases} \qquad \text{Equation 4}$$

Here, an additive white Gaussian channel (AWGN) may be assumed in the calculation of BER for SNR estimation. $\gamma_b$ denotes the SNR, and the Q function may use a tail function of a Gaussian probability distribution. From Equation 4, the SNR may be calculated from the BER based on an inverse function ($Q^{-1}$) of the BER ($\gamma_b$).

According to an embodiment, in operation 903, the electronic device 101 may calculate, based on the estimated SNR as described above, a BER ($e_b$) in a case of using an MCS corresponding to a transmission rate, for example, one level higher than that of an MCS previously determined or used on the slow link.

According to an embodiment, in operation 905, the electronic device 101 may compare the calculated BER $e_b$ with a target BER ($e_{target}$) and, when the calculated BER $e_b$ is lower than the target BER, the process may proceed to operation 907 and enables the electronic device 101 to increase an MCS of the slow link by one level and use. On the other hand, when the calculated BER ($e_b$) is not lower than the target BER ($e_{target}$), the process may proceed to operation 909 and enables the electronic device 101 to use an existing MCS of the slow link as it is.

According to an embodiment, in operation 911, depending on whether the MCS for the slow link, which is one level higher than the MCS used for the previous transmission is applied to the slow link, when the MCS higher by one level is applied, the electronic device 101 may calculate a transmission time $T_{fast}$ for the fast link and a transmission time $T_{slow}$ for the slow link based on the MSC applied to each link, in operation 913. The transmission times may be calculated based on, for example, the transmission rate and the size of the transmitted packets in each link.

According to an embodiment, the electronic device 101 may compare a difference ($T_{fast}-T_{slow}$) between the transmission time $T_{fast}$ on the fast link and the transmission time $T_{slow}$ on the slow link with a target value $T_{target}$ in operation 915, and when the difference is greater than the target value $T_{target}$, the process may proceed to operation 917 and enables the electronic device 101 to change the MCS of the fast link to the MCS corresponding to a transmission rate that is one level lower. When, in operation 915, the difference ($T_{fast}-T_{slow}$) between the transmission time $T_{fast}$ on the fast link and the transmission time $T_{slow}$ on the slow link is not greater than the target value $T_{target}$, the process may proceed to operation 919 and enables the electronic device 101 to determine to use an existing MSC of the fast link as it is without change.

According to an embodiment, even when it is desired to change the MCS in the fast link to an MSC that is one level lower, the change may be allowed as long as the transmission rate of the fast link, $r_{fast}$, is not smaller than the transmission rate of the slow link, $r_{slow}$. Accordingly, in operation 921, when the transmission rate of the fast link, $r_{fast}$, is smaller than the transmission rate of the slow link, $r_{slow}$, the process may proceed to operation 923 and enables the electronic device 101 to use the existing MCS of the fast link as it is without change.

Figure 10:
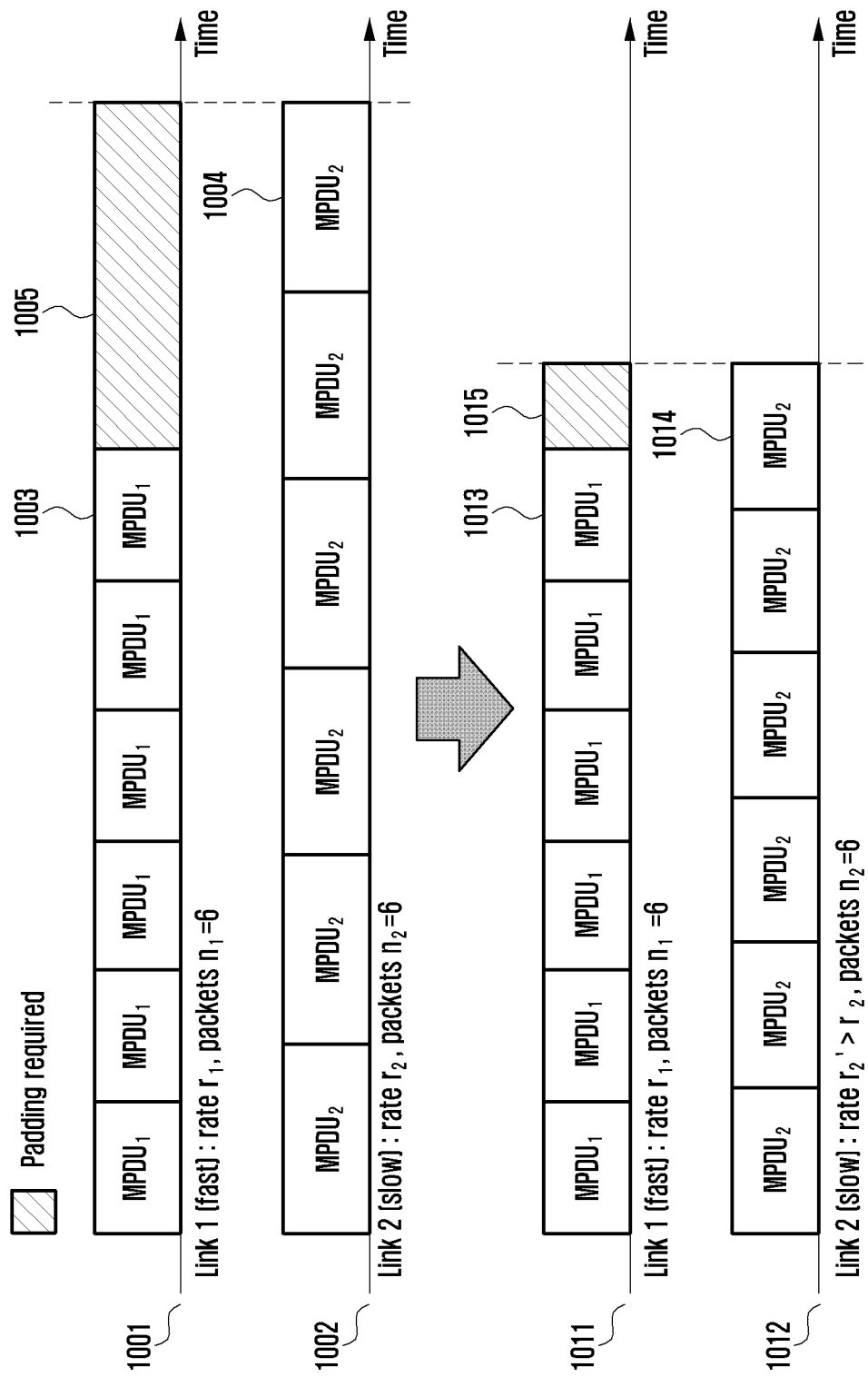
FIGS. 10 to 12 illustrate examples of an operation of adjusting a link-specific transmission rate to control multi-link communication of an electronic device according to various embodiments.

FIG. 10 illustrates an example of an operation of adjusting a link-specific transmission rate to control multi-link communication of an electronic device (e.g., the electronic device 101 of FIG. 1) according to various embodiments.

Referring to FIG. 10, a transmission rate of a first link 1001 is identified as $r_1$ and the number of packets to be transmitted may be 6, and a transmission rate of a second link 1002 is identified as $r_2$ and the number of packets to be transmitted may be 6. In this case, $r_1 > r_2$ may be satisfied, and in a fast first link, after transmission of a last packet 1003 is completed, dummy data or duplicate data may be padded (indicated by reference numeral 1005) and transmitted to match the transmission end time of the fast first link 1001 with end time of a last packet 1004 of the slow second link 1002.

According to an embodiment, the transmission rate of the first link, which is a slow link, is adjusted to match the transmission times of the first link and the second link as closely as possible, so as to enable reducing the padding area 1005.

According to an embodiment, in a case that the number of packets $n_1$ to be transmitted at a transmission rate $r_1$ on the first link is 6 ($n_1$=6) and the number of packets $n_2$ to be transmitted at a transmission rate $r_2$ on the second link is 6 ($n_2$=6), changing the transmission rate of the second link, which is a slow link, to $r_2'$, for example, by increasing the transmission rate by one level or more may result in the reduced packet transmission time of a second link 1012 for the same number of packets. For example, a padding area 1015 corresponding to the difference between a time at which the transmission of a last packet 1014 of the second link 1012 ends and a time at which the transmission of a last packet 1013 of the first link ends may be reduced compared to the previous padding area 1005. That is, the padding area of the fast link is reduced so that multi-link transmission may be efficiently performed. In addition, data transmission through all multiple links may be performed in a shorter time, and data transmission of each link may be ended at the same time, thereby reducing resource waste for communication.

Figure 11:
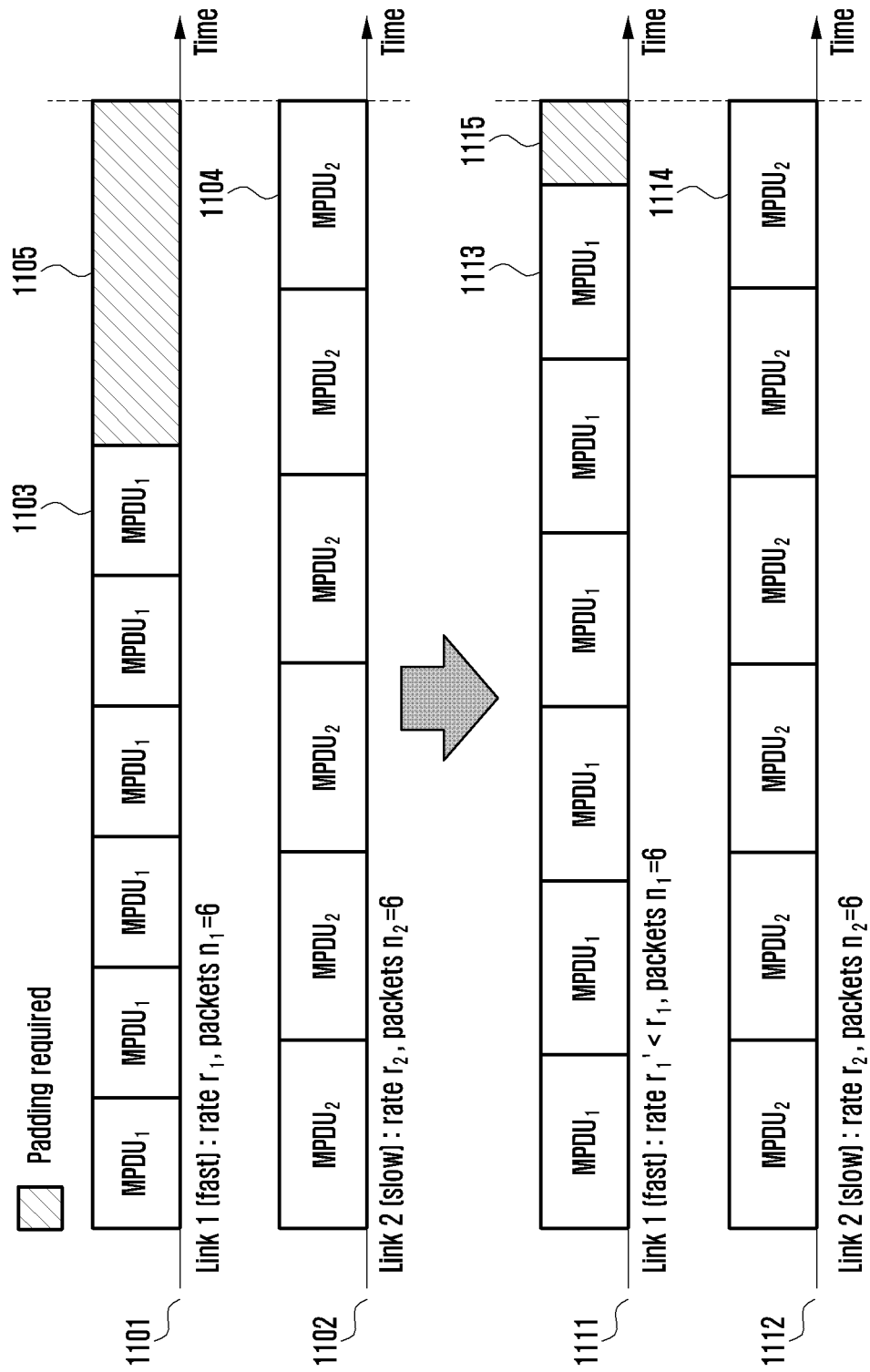

Referring to FIG. 11, a transmission rate of a first link 1101 is identified as r1 and the number of packets to be transmitted may be 6, and a transmission rate of a second link 1102 is identified as r2 and the number of packets to be transmitted may be 6. In this case, r1>r2 may be satisfied, and in a fast first link 1101, after transmission of a last packet 1103 is completed, dummy data or duplicate data may be padded (indicated by reference numeral 1105) and transmitted to match the transmission end time with end time of a last packet 1104 of the slow second link 1102.

According to an embodiment, the transmission rate of the first link, which is a fast link, is adjusted to match the transmission times of the first link and the second link as closely as possible, so as to enable reducing the padding area 1105.

According to an embodiment, in a case that the number of packets $n_1$ to be transmitted at a transmission rate $r_1$ on the first link is 6 ($n_1$=6) and the number of packets $n_2$ to be transmitted at a transmission rate $r_2$ on the second link is 6 ($n_2$=6), changing the transmission rate of the first link, which is a fast link, for example, to r1' by increasing the transmission rate by one level or more may result in the increased packet transmission time of a first link 1111 for the same number of packets. For example, a padding area 1115 corresponding to the difference between a time at which the transmission of a last packet 1113 of the first link 1111 ends and a time at which the transmission of a last packet 1114 of the second link 1112 ends may be reduced compared to the previous padding area 1105. That is, the padding area of the fast link is reduced so that multi-link transmission may be efficiently performed. In addition, data transmission through all multiple links may be ended at the same time.

Figure 12:
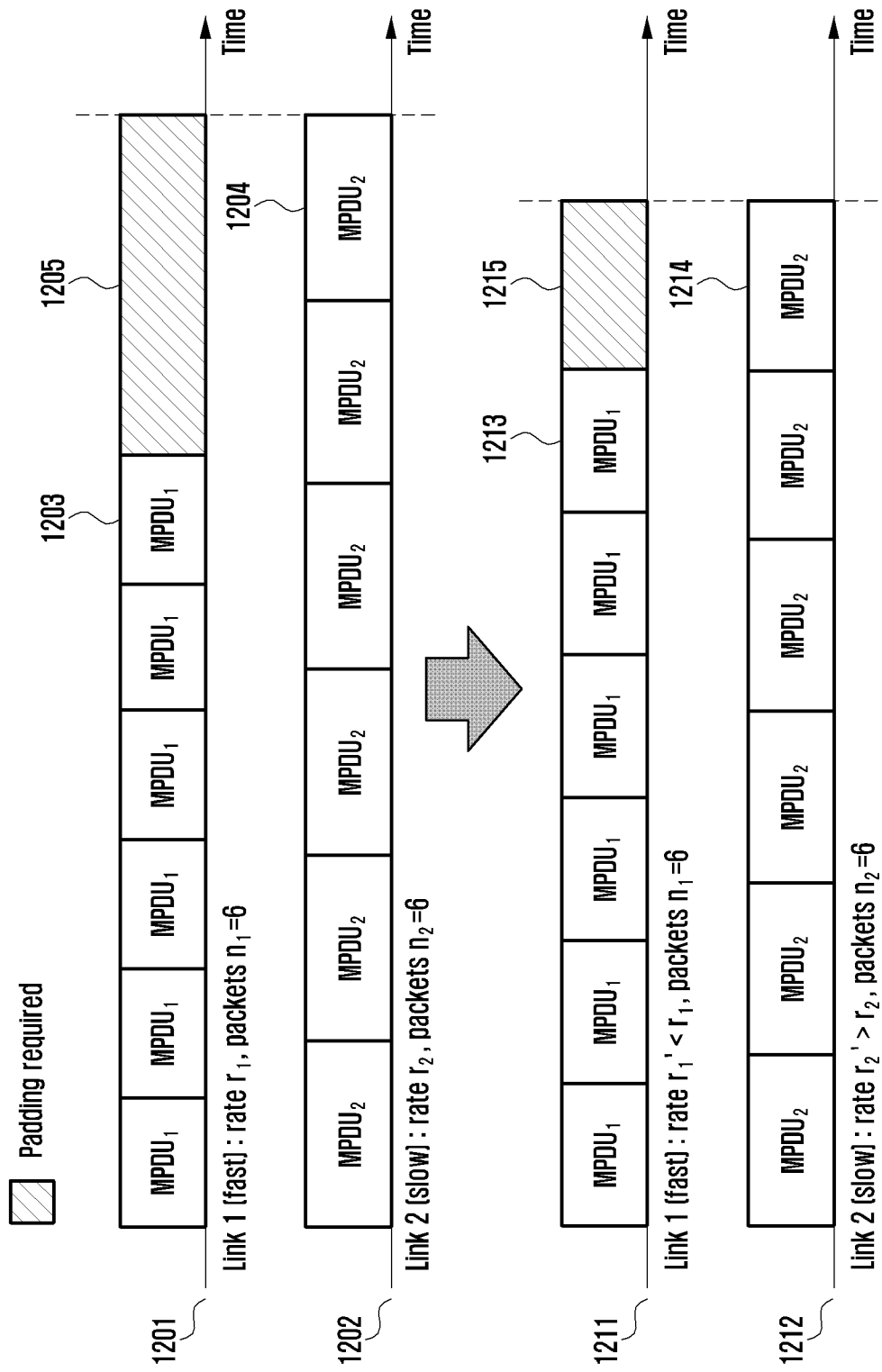

FIG. 12 illustrates an example of an operation of adjusting a link-specific transmission rate to control multi-link communication of an electronic device (e.g., the electronic device 101 of FIG. 1) according to various embodiments.

Referring to FIG. 12, a transmission rate of a first link 1201 is identified as $r_1$ and the number of packets to be transmitted may be 6, and a transmission rate of a second link 1202 is identified as $r_2$ and the number of packets to be transmitted may be 6. In this case, r1>r2 may be satisfied, and in a fast first link, after transmission of a last packet 1203 is completed, dummy data or duplicate data may be padded (indicated by reference numeral 1205) and transmitted to match the transmission end time with end time of a last packet 1204 of the slow second link 1202.

According to an embodiment, the transmission rates of both the first link, which may be a fast link, and the second link, which may be a slow link, are adjusted to match the transmission times of the first link and the second link as closely as possible, so as to enable reducing the padding area 1205.

According to an embodiment, in a case that the number of packets $n_1$ to be transmitted at a transmission rate $r_1$ on the first link is 6 ($n_1$=6) and the number of packets $n_2$ to be transmitted at a transmission rate $r_2$ on the second link is 6 ($n_2$=6), changing the transmission rate of the second link, which is a slow link, for example, to $r_2'$ by increasing the transmission rate by one level or more and changing the transmission rate of the first link, which is a fast link, for example, to $r_1'$ by lowering the transmission rate by one level or less may result in the reduced packet transmission time of a second link 1212 and the increased packet transmission time of a first link 1211 for the same number of packets. For example, a padding area 1215 corresponding to the difference between a time at which the transmission of a last packet 1213 of the first link 1211 ends and a time at which the transmission of a last packet 1214 of the second link 1212 ends may be reduced compared to the previous padding area 1205. That is, the padding area of the fast link is reduced so that multi-link transmission may be efficiently performed. In addition, data transmission through all multiple links may be performed in a shorter time, and data transmission of each link may be ended at the same time, thereby reducing resource waste for communication.

According to various embodiments, a method by an electronic device (e.g., the electronic device 101 of FIG. 1 or FIG. 3) may include distributing data packets to be transmitted through multiple communication links including a first link and a second link through multiple frequency bands to at least one of the multiple communication links, respectively, identifying a first transmission rate of the first link and a second transmission rate of the second link, and performing at least one of an adjustment of the transmission rates or an adjustment of the number of distribution of data packets for the first link and the second link so that a difference between transmission times of the data packets distributed to the first link and the second link, respectively, is within a designated time range, based on the first transmission rate, the second transmission rate, and the total number of data packets transmitted through the multiple communication links.

According to various embodiments, in a case that the number of data packets distributed to the first link and the second link is designated respectively, an operation of redistributing at least one of the packets distributed to the second link having a longer transmission time to the first link having a shorter transmission time may be performed.

According to various embodiments, by using the first transmission rate of the first link and the number of data packets distributed to the first link, and the second transmission rate of the second link and the number of data packets distributed to the second link, the number of data packets to be redistributed from the second link to the first link may be calculated based on an inverse ratio between the first transmission rate and the second transmission rate.

According to various embodiments, the total number of data packets transmitted through the multiple communication links, the first transmission rate of the first link, and the second transmission rate of the second link may be identified, and the number of data packets to be distributed to the first link and the second link, respectively, may be calculated.

According to various embodiments, the first transmission rate of the first link, the second transmission rate of the second link, and the number of packets distributed to the multiple communication links may be identified, and the number of the packets to be distributed to the first link and the second link, respectively, may be calculated based on a ratio between the first transmission rate and the second transmission rate.

According to various embodiments, in a case that the number of data packets to be distributed to the first link and the second link is designated, a transmission time on the first link according to the first transmission rate and a transmission time on the second link according to the second transmission rate may be calculated, and at least one of the first transmission rate or the second transmission rate may be adjusted based on a difference between the transmission times.

According to various embodiments, the first transmission rate or the second transmission rate may be adjusted by lowering the first transmission rate by one level or increasing the second transmission rate by one level, and among the transmission rates of the first link or the second link, the first transmission rate is relatively fast and the second transmission rate is relatively slow.

According to various embodiments, in a case of increasing the second transmission rate of the second link by one level, a signal to noise ratio (SNR) according to a previous transmission rate may be estimated and a bit error ratio (BER) of the second link may be calculated based on the estimated SNR, and when the calculated BER is less than a designated value, the second transmission rate of the second link may be increased by one level.

According to various embodiments, in a case of lowering the first transmission rate of the first link by one level, data packet transmission times of the first link and the second link may be calculated, and in a case that the transmission time of the first link is faster than the transmission time of the second link, the transmission rate of the first link may be lowered by one level.

According to various embodiments, the multiple communication links may include multiple communication links among a communication link of a 2.4 GHz frequency band, a communication link of a 5 GHz frequency band, or a communication link of a 6 GHz frequency band, which are based on Wi-Fi communication.

The embodiments disclosed herein are presented by way of example only to illustrate and facilitate understanding of the technology, and are not intended to limit the scope of the technology disclosed herein. Therefore, the scope of the technology disclosed herein should be construed to include not only the embodiments disclosed herein, but also any modifications or variations derived from the technical ideas of the various embodiments disclosed herein.

The invention claimed is:

1. An electronic device comprising:
 a memory;
 a communication circuit configured to support multiple communication links including a first link and a second link; and
 a processor operatively connected to the communication circuit and the memory,
 wherein the memory stores instructions that, when executed by the processor individually or collectively, cause the electronic device to:
 distribute data packets to be transmitted through the communication circuit to at least two of the multiple communication links, including the first link and the second link;
 identify a first transmission rate of the first link and a second transmission rate of the second link; and
 perform at least one of an adjustment of the first transmission rate or the second transmission rate or an adjustment of a first number of data packets distributed to the first link or a second number of data packets distributed to the second link so that a difference between a first transmission time of data packets distributed to the first link and a second transmission time of data packets distributed to the second link is within a designated time range, based on the first transmission rate, the second transmission rate, and a total number of data packets transmitted through the multiple communication links.

2. The electronic device of claim 1, wherein the memory stores instructions that, when executed by the processor individually or collectively, cause the electronic device to, in a case that the first number of data packets distributed to the first link and the second number of data packets distributed to the second link are designated respectively, redistribute at least one of the packets distributed to the second link to the first link, wherein the second transmission time is longer than the first transmission time.

3. The electronic device of claim 2, wherein the memory stores instructions that, when executed by the processor individually or collectively, cause the electronic device to, by using the first transmission rate and the first number of data packets, and the second transmission rate and the second number of data packets, calculate a number of data packets to be redistributed from the second link to the first link based on an inverse ratio between the first transmission rate and the second transmission rate.

4. The electronic device of claim 1, wherein the memory stores instructions that, when executed by the processor individually or collectively, cause the electronic device to identify the total number of data packets transmitted through the multiple communication links, the first transmission rate of the first link, and the second transmission rate of the second link, and calculate the first number of data packets to be distributed to the first link and the second number of data packets to be distributed to the second link.

5. The electronic device of claim 4, wherein the memory stores instructions that, when executed by the processor individually or collectively, cause the electronic device to calculate the first number of data packets to be distributed to the first link and calculate the second number of data packets to be distributed to the second link, based on a ratio between the first transmission rate and the second transmission rate.

6. The electronic device of claim 1, wherein the memory stores instructions that, when executed by the processor individually or collectively, cause the electronic device to, in a case that the first number of data packets distributed to the first link and the second number of data packets distributed to the second link are designated respectively, calculate the first transmission time of the first link according to the first transmission rate and the second transmission time of the second link according to the second transmission rate, and adjust at least one of the first transmission rate or the second transmission rate based on a difference between the first transmission time and the second transmission time.

7. The electronic device of claim 6, wherein the memory stores instructions that, when executed by the processor individually or collectively, cause the electronic device to adjust the first transmission rate or the second transmission rate by lowering the first transmission rate by one level in an associated modulation and coding scheme (MCS) table, or increasing the second transmission rate by one level in the associated MCS table, wherein the first transmission rate is faster than the second transmission rate.

8. The electronic device of claim 7, wherein the memory stores instructions that, when executed by the processor individually or collectively, cause the electronic device to, in a case of increasing the second transmission rate of the second link by one level in the associated modulation and coding scheme (MCS) table, estimate a signal to noise ratio (SNR) according to a previous transmission rate, calculate a bit error ratio (BER) of the second link based on the estimated SNR, and increase the second transmission rate of the second link by one level in the associated MCS table, when the calculated BER is less than a designated value.

9. The electronic device of claim 7, wherein the memory stores instructions that, when executed by the processor individually or collectively, cause the electronic device to calculate a data packet transmission time of the first link and the second link, in a case of lowering the first transmission rate of the first link by one level in the associated modulation and coding scheme (MCS) table, and to lower the transmission rate of the first link by one level in the associated MCS table, in a case that the transmission time of the first link is faster than the transmission time of the second link.

10. The electronic device of claim 1, wherein the multiple communication links comprise multiple communication links among a communication link of a 2.4 GHz frequency band, a communication link of a 5 GHz frequency band, or a communication link of a 6 GHz frequency band.

11. A method performed by an electronic device, the method comprising:
  distributing data packets to be transmitted through multiple communication links including a first link and a second link to at least two of the multiple communication links, including the first link and the second link;
  identifying a first transmission rate of the first link and a second transmission rate of the second link; and
  performing at least one of an adjustment of the first transmission rate or the second transmission rate or an adjustment of a first number of data packets distributed to the first link or a second number of data packets distributed to the second link so that a difference between a first transmission time of data packets distributed to the first link and a second transmission time of data packets distributed to the second link is within a designated time range, based on the first transmission rate, the second transmission rate, and a total number of data packets transmitted through the multiple communication links.

12. The method of claim 11, further comprising, in a case that the first number of data packets distributed to the first link and the second number of data packets distributed to the second link are designated respectively, redistributing at least one of the packets distributed to the second link to the first link, wherein the second transmission time is longer than the first transmission time.

13. The method of claim 12, further comprising, by using the first transmission rate and the first number of data packets, and the second transmission rate and the second number of data packets, calculating a number of data packets to be redistributed from the second link to the first link based on an inverse ratio between the first transmission rate and the second transmission rate.

14. The method of claim 11, further comprising identifying the total number of data packets transmitted through the multiple communication links, the first transmission rate of the first link, and the second transmission rate of the second link, and calculating the first number of data packets to be distributed to the first link and the second number of data packets to be distributed to the second link.

15. The method of claim 14, further comprising calculating the first number of data packets to be distributed to the first link and calculating the second number of data packets to be distributed to the second link, based on a ratio between the first transmission rate and the second transmission rate.

16. The method of claim 11, further comprising:
  in a case that the first number of data packets distributed to the first link and the second number of data packets distributed to the second link are designated respectively, calculating the first transmission time of the first link according to the first transmission rate and the second transmission time of the second link according to the second transmission rate; and
  adjusting at least one of the first transmission rate or the second transmission rate based on a difference between the first transmission time and the second transmission time.

17. The method of claim 16, further comprising adjusting the first transmission rate or the second transmission rate by lowering the first transmission rate by one level in an associated modulation and coding scheme (MCS) table, or increasing the second transmission rate by one level in the associated MCS table, wherein the first transmission rate is faster than the second transmission rate.

18. The method of claim 17, further comprising:
  in a case of increasing the second transmission rate of the second link by one level in the associated modulation and coding scheme (MCS) table, estimating a signal to noise ratio (SNR) according to a previous transmission rate;
  calculating a bit error ratio (BER) of the second link based on the estimated SNR; and
  increasing the second transmission rate of the second link by one level in the associated MCS table, when the calculated BER is less than a designated value.

19. The method of claim 17, further comprising:
  calculating a data packet transmission time of the first link and the second link, in a case of lowering the first transmission rate of the first link by one level in the associated modulation and coding scheme (MCS) table; and
  lowering the transmission rate of the first link by one level in the associated MCS table, in a case that the transmission time of the first link is faster than the transmission time of the second link.

20. The method of claim 11, wherein the multiple communication links comprise multiple communication links among a communication link of a 2.4 GHz frequency band, a communication link of a 5 GHz frequency band, or a communication link of a 6 GHz frequency band.

* * * * *